Feb. 18, 1958     W. G. MARTIN ET AL     2,823,415
APPARATUS FOR HEAT AND PRESSURE CURING OF ARTICLES
Filed July 15, 1954
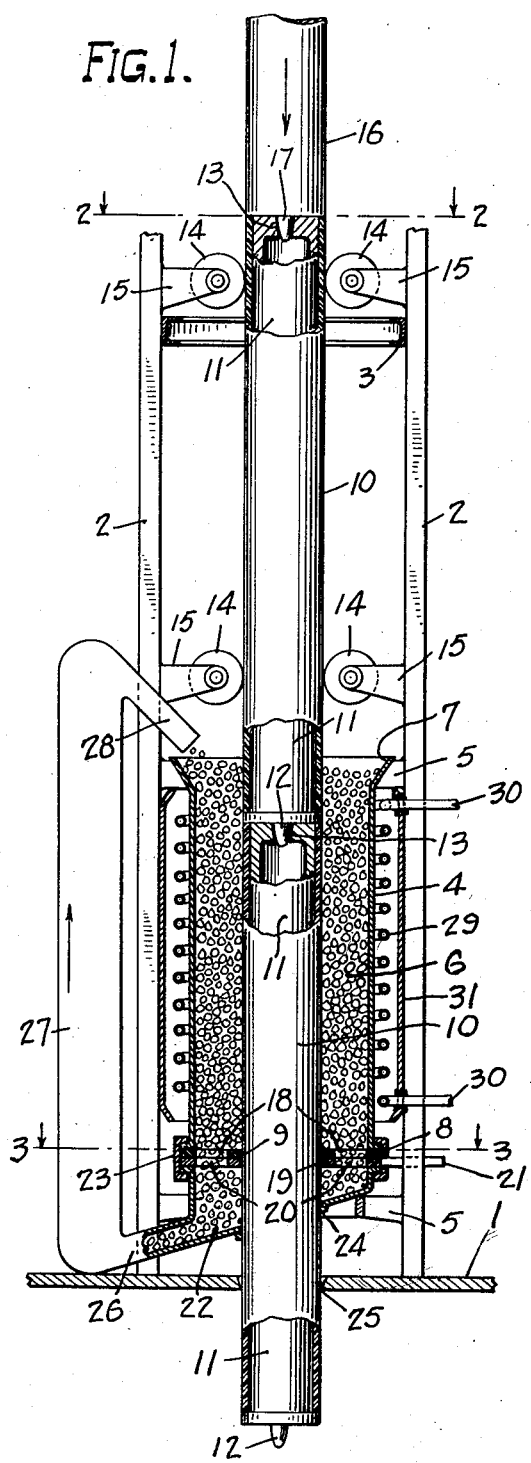
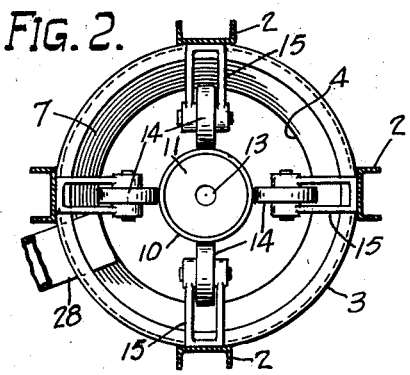
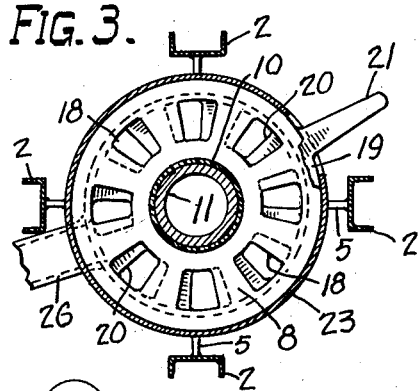
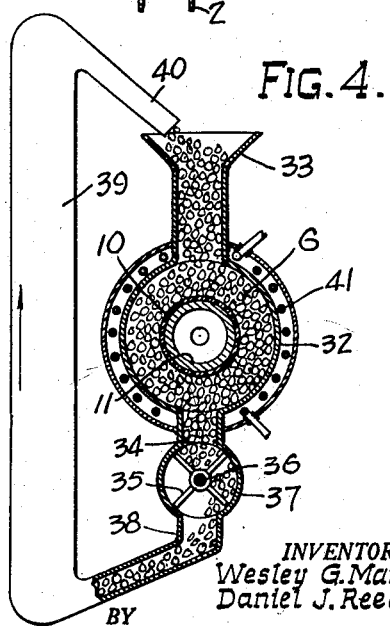
INVENTORS:
Wesley G. Martin
Daniel J. Reed
BY
ATTORNEYS.

United States Patent Office 2,823,415
Patented Feb. 18, 1958

2,823,415

APPARATUS FOR HEAT AND PRESSURE CURING OF ARTICLES

Wesley G. Martin and Daniel J. Reed, Milwaukee, Wis., assignors to A. O. Smith Corporation, Milwaukee, Wis., a corporation of New York Application July 15, 1954, Serial No. 443,542

4 Claims. (Cl. 18—1)

This invention relates to an apparatus for the heat and pressure curing of materials and more particularly to the heat and pressure curing of resin-bonded fiber glass articles.

In the manufacture of resin-bonded fiber glass articles, it is desirable to cure the resin by heat to obtain the optimum decomposition rate of the catalyst employed and thereby obtain the most favorable chemical linkage in the resin and the maximum physical properties in the article. In addition to heating the article, the physical properties, such as strength and water resistance, of certain types of resins, such as condensation polymers, are increased by curing the article under pressure.

The present invention is directed to an apparatus for applying heat and pressure to a resin-bonded fiber glass article, such as a pipe, to polymerize the resin and increase the physical properties of the pipe.

According to the invention, the apparatus comprises a hollow casing which contains a mass of divided solid heat transfer material, such as metal or ceramic balls. Aligned openings are formed in opposite ends of the casing and the hollow article to be cured is passed through the openings in contact with the heat transfer material to subject the hollow article to the pressure exerted by the weight of the material.

Heat is applied to the heat transfer material so that the portion of the hollow article under pressure is heated to the desired polymerization temperature.

To enable the hollow article to pass freely through the heat transfer material, the material is circulating within the casing in the direction of article travel and the rate of circulation is controlled by a valve means.

The present invention is directed to an apparatus for long lengths of pipe or similar hollow articles. Successive lengths of pipe can be fed through the casing in an end-to-end relation to obtain continuous curing of indefinite lengths of pipe.

The apparatus is of a simple design and may be constructed so that pipe or other hollow articles can move either horizontally or vertically through the casing. In a vertical type of pipe travel, the pressure on the pipe is progressively increased as the pipe moves downwardly through the casing. In either case, both the pressure and the temperature can be controlled to achieve the optimum conditions.

The drawing furnished herewith illustrates the best mode presently contemplated of carrying out the invention set forth hereinafter.

In the drawing:

Figure 1 is a longitudinal elevational view of the apparatus of the invention with parts broken away and sectioned;

Fig. 2 is a section taken along line 2—2 of Figure 1;

Fig. 3 is a section taken along line 3—3 of Figure 1; and

Fig. 4 is a side elevation, with parts broken away and sectioned, of a modified form of the apparatus.

Figures 1, 2 and 3 of the drawing illustrate an apparatus for the heating and pressure curing of materials comprising a base plate 1 which supports a plurality of circularly spaced, upstanding frame members 2. The frame members 2 are connected near their upper extremities by reinforcing ring 3 to provide an integral supporting frame.

A vertically disposed cylindrical casing 4 is secured within the frame by a plurality of brackets 5 which are connected between the frame members 2 and the outer surface of the casing. The casing contains a mass of divided solid heat transfer material 6 such as metal or ceramic pebbles or balls.

The upper end of casing 4 is flared outwardly as at 7 to provide a hopper-type opening into the interior of the casing.

The bottom of casing 4 is enclosed by a plate 8 having an axial opening 9 therein. A series of unpolymerized, resin-bonded, fiber glass pipe sections 10 are adapted to travel downwardly through casing 4 and are discharged through opening 9.

The pipe sections 10 are formed by winding fibrous strands or roving, such as glass, cotton or synthetic fibers around a cylindrical mandrel 11 and coating the fibers either before or after the winding operation with an unpolymerized resin solution. The pipe sections 10, carried on mandrels 11 pass through casing 4 in contact with the heat transfer material 6 and are subjected to the pressure exerted by the weight of the material. This pressure acting inwardly on the pipe sections during polymerization of the resin serves to increase the physical properties of the cured resin pipe sections.

The pipe sections 10 are adapted to pass through casing 4 in an end-to-end relation so that the sections will be cured in a substantially continuous operation. The pipe sections are axially aligned by providing the leading end of the mandrel 11 on which the pipe section is wound with a projection 12 which is adapted to be received within a complementary socket 13 formed in the trailing end of the preceding mandrel. By this construction a series of pipe sections follow each other in an end-to-end relation through the casing 4.

To guide the pipe sections 10 before they enter the casing 4 and maintain alignment of the sections, a plurality of rollers 14 are rotatably mounted on brackets 15 which are secured to the frame members 2. The pipe sections 10 are adapted to pass within the series of circularly spaced rollers 14 and are guided in downward movement by the same.

The pipe sections 10 are moved through casing 4 by a ram 16 which engages the trailing end of the last mandrel 11 in the series and drives the mandrels and pipe sections downwardly. The leading end of the ram 16 is provided with a projection 17 which is received within the socket 13 in the trailing end of the last mandrel 11.

The ram may be driven in a reciprocating path by any conventional mechanism, not shown.

To reduce the frictional resistance between the pipe sections 10 as they move through casing 4 and the heat transfer material 6, the bottom plate 8 is provided with a series of circularly spaced openings 18 through which the heat transfer material 6 may be discharged from the casing 4. The heat transfer material is adapted to move downwardly through the casing in the form of a downwardly moving bed as the pipe sections move through the casing. Thus, both the pipe sections 10 and the heat transfer material 6 are moving in the same direction and the frictional resistance between the two is substantially reduced.

The openings 18 in plate 8 are adapted to be closed completely or partially by a plate 19 which is rotatably disposed in flat-wise relation to the bottom surface of plate 8.

The plate 19 is formed with a series of openings 20 which correspond generally in size and spacing to openings 18 in plate 8 and an axial opening disposed in alignment with opening 9 of plate 8. Plate 19 is adapted to be rotated through operation of a handle 21 which extends outwardly therefrom.

By rotating plate 19 with respect to plate 8 the openings 20 can be brought into any degree of alignment with the openings 18 to regulate the flow of heat transfer material from the casing.

To recirculate the heat transfer material, a trough 22 is disposed beneath plate 19 and serves to collect the heat transfer material discharged through openings 20. A retaining ring 23 engages the flanged ends of casing 4 and trough 22 to attach the trough to the casing. The retaining ring 23 is provided with a sufficient width to permit plate 19 to be freely rotated with respect to plate 8. A suitable slot is provided in ring 23 for the operation of handle 21.

Openings 24 and 25 are provided in trough 22 and base 1, respectively, to permit the pipe sections to pass therethrough. Openings 24 and 25 are disposed in alignment with the axial openings in plates 8 and 19.

A feed leg 26 provides communication between the trough 22 and the lower end of an elevator 27 which serves to lift the heat transfer material to the upper end of the casing. The upper end of the elevator 27 is provided with a spout 28 which opens into the upper hopper end 7 of the casing, and the material 6 is discharged from the elevator 27 through spout 28 into the casing.

The elevator 27 which raises the heat transfer material to the top of the casing may be a bucket, screw or fluid type lift, with the particular type of lift depending on the size and nature of the heat transfer material and the height of the casing.

The pipe sections 10 are generally heated by any conventional means as they move through the casing 4 in order to obtain the optimum rate of decomposition of the catalyst and cure the resin. As shown in the drawing, heat is induced in the heat transfer material 6 by an induction heating coil 29 which is disposed around the casing 4. Electrical leads 30 from a suitable source of electric current, not shown, are connected to the coil 29. Alternately the heating may be accomplished by means of steam, hot water or any other desired heating means.

A protective sleeve 31 is disposed outwardly of coil 29 and is secured to the frame members 2. The sleeve 31 serves to protect the coil and reflect heat inwardly toward the casing to increase the efficiency of the heat transfer. Coil 29 serves to heat the heat transfer material 6 as the material passes downwardly within casing 4. Heat is transferred from material 6 to the pipe sections 10 to heat the resin pipe sections to the desired polymerization temperature.

In operation, a pipe section 10 or a dummy pipe of the same diameter as the pipe section to be cured is introduced within the empty casing 4. The casing is then filled with the heat transfer material 6 and heat is applied to the material through heat coil 29.

A second pipe section is disposed within the guide rollers 14 and aligned with the first pipe section which is disposed within the casing 4. The two sections are aligned by engagement of the projection 12 on the leading end of the upper mandrel with the socket 13 within the trailing end of the lower mandrel.

When the temperature of the material 6 has been raised to the desired level, the pipe is moved downwardly by the action of ram 16 on the trailing end of the uppermost mandrel 11. The pipe sections are moved downwardly at a speed to heat the pipe section to the temperature necessary to obtain the optimum decomposition rate of the catalyst and polymerize the resin. If a dummy pipe is employed to begin the operation, a second pipe section is aligned with the dummy and is fed downwardly into the casing by action of the ram 16. During the downward movement of the pipe section through the casing, the pipe section is subject to the pressure exerted by the weight of the heat transfer material and any given increment of the length of the pipe is subjected to a progressively greater pressure as the pipe moves downwardly within the casing.

By rotating plate 19, the rate of flow of the heat transfer material 6 through the aligned openings 18 and 20 may be regulated to the proper degree, and this controlled flow of the material 6 not only reduces the frictional resistance between the pipe section 10 and the material, but also determines the temperature to which the material is heated.

When the ram reaches the end of its working stroke, the ram is withdrawn from engagement with the uppermost mandrel and a third mandrel carrying a pipe section is aligned in an end-to-end relation with the second section. The ram is then moved downwardly to drive the pipe sections through the casing. This operation is repeated with additional pipe sections being engaged in an end-to-end relation with those aligned in the apparatus and then moved through the casing by the ram until the desired number of pipe sections have been cured. By this method an indefinite number of pipe sections can be cured in a substantially continuous operation.

A modification of the present invention is shown in Fig. 4. In this embodiment, the pipe section 10 which is wound on mandrel 11 is moved horizontally through aligned openings in the ends of casing 32 which corresponds to casing 4 of the first embodiment.

The casing 32 contains heat transfer material 6 such as pebbles, sand or the like. The heat transfer material is introduced into the casing 32 through a hopper 33 which is secured to the upper surface of the casing. The heat transfer material passes downwardly through the casing in the form of a downwardly moving bed and is discharged from the bottom of the casing into a trough 34.

The rate of flow of the heat transfer material through the casing 32 is controlled by a rotary vane 35 which is rotatably mounted on a shaft 36. The vane is confined within a housing 37 which communicates with the bottom of trough 34. Shaft 36 is driven by a power source, not shown, which produces a rotation of vane 35 within the housing 37. By regulating the speed of rotation of the vane 35, the rate of flow of the heat transfer material through the casing can be controlled.

The heat transfer material is discharged from housing 37 into a discharge trough 38 which communicates with the lower end of elevator shaft 39 corresponding to elevator shaft 27 of the first embodiment. The upper end of elevator shaft 39 is provided with a spout 40 to discharge the heat transfer material into hopper 33 from the elevator, not shown, which operates in shaft 39.

As in the case of the first embodiment, heat is supplied to the heat transfer material by a heating coil 41 which is disposed around the outer surface of the casing 32.

The operation of the modified form of the invention, shown in Fig. 4, is similar to that of the first embodiment. The pipe section 10 disposed on mandrel 11 is introduced within the openings in the ends of casing 32. The casing is then filled with the heat transfer material and the material is heated to the desired temperature through operation of heating coil 41.

A second mandrel having a pipe section wound thereon is aligned in an end-to-end relation with the mandrel disposed within the casing, and a ram similar to the ram shown in the first embodiment acts against the trailing end of the second mandrel to move the pipe sections through the casing at a speed necessary to heat the pipe sections to the desired temperature. The pipe sections passing within casing 32 are subjected to the weight of the heat transfer material 6 which exerts a pressure against the pipe sections during polymerization of the resin.

In either embodiment of the invention, seals may be provided at the position of discharge of the pipe section from the casing so as to prevent the heat transfer material from being discharged from the casing with the pipe section. The use of seals will depend on the nature and size of the heat transfer material employed.

The present inventon provides a resin-bonded fiber glass pipe having high strength and increased physical properties due to the combination of heat and pressure curing.

The apparatus of the invention enables a plurality of lengths of pipe to be continuously cured rather than each length being cured in a batch process. Long lengths of pipe can pass through the apparatus in an end-to-end relation to obtain a substantially continuous curing of an indefinite length of pipe.

The apparatus of the invention also provides means for adjusting the temperature and the pressure on the pipe so that the optimum pressure and temperature may be attained for each particular type of resin employed.

While the above description of the invention is directed to the heat and pressure curing of a fibrous reinforced resin pipe, it is contemplated that the present invention can be employed to apply heat and pressure to any elongated articles of corresponding materials to cure them accordingly.

Various modes of carrying out the invention are contemplated as within the scope of the following claims particularly pointing out and distinctly claiming the subject matter which is regarded as the invention.

We claim:

1. An apparatus for applying heat and pressure to a rigid elongated unpolymerized resin article, comprising a hollow container of substantial height and having axially aligned inlet and outlet openings adapted to receive the elongated article and with the outlet opening substantially below the top of the container, means to move the article longitudinally through the container to progressively treat the article, a bed of divided solid material filling said container and surrounding the portion of the article within the container in substantially direct contact therewith to apply pressure to the resin for assisting in curing the same, and means to heat said material with the heat being transferred to the article within the container to polymerize the resin of the article.

2. The apparatus of claim 1 in which the divided solid material comprises small steel balls and said heating means comprises electric induction heating means including a primary coil encircling the container with an axis substantially coinciding with the axis of the inlet and outlet openings.

3. The apparatus of claim 1 in which the axis of the inlet and outlet openings is substantially vertical and the bottom of the container has the outlet opening and extends to adjacent the article at the outlet opening to separate the material from the article as the latter passes downwardly through the outlet opening.

4. The apparatus of claim 1 in which an opening is provided in the bottom of the container for the discharge of said material effecting a downward movement of the bed of material in the container facilitating movement of the article through the material, and recirculating means are provided for returning the discharged material to the top of the container.

References Cited in the file of this patent

UNITED STATES PATENTS

| | | |
|---|---|---|
| 1,661,888 | Fisher | Mar. 6, 1928 |
| 1,959,565 | Brostrom | May 22, 1934 |
| 2,187,024 | Fowler | Jan. 16, 1940 |
| 2,683,900 | Lotz | July 20, 1954 |